US 9,264,486 B2

(12) United States Patent
Joshi et al.

(10) Patent No.: US 9,264,486 B2
(45) Date of Patent: Feb. 16, 2016

(54) WORK LOAD MANAGEMENT PLATFORM

(71) Applicant: Bank of America Corporation, Charlotte, NC (US)

(72) Inventors: Alok Joshi, Bordentown, NJ (US); Anand A. Deshmukh, Allen, TX (US); Muralidharan Palanisamy, Jersey City, NJ (US)

(73) Assignee: Bank of America Corporation, Charlotte, NC (US)

( * ) Notice: Subject to any disclaimer, the term of this patent is extended or adjusted under 35 U.S.C. 154(b) by 230 days.

(21) Appl. No.: 13/708,594

(22) Filed: Dec. 7, 2012

(65) Prior Publication Data

US 2014/0164554 A1    Jun. 12, 2014

(51) Int. Cl.
| | |
|---|---|
| G06F 15/16 | (2006.01) |
| H04L 29/08 | (2006.01) |
| G06F 9/48 | (2006.01) |

(52) U.S. Cl.
CPC .............. *H04L 67/10* (2013.01); *G06F 9/4856* (2013.01)

(58) Field of Classification Search
USPC .................... 709/217, 226; 707/636; 718/105
See application file for complete search history.

(56) References Cited

U.S. PATENT DOCUMENTS

| | | | |
|---|---|---|---|
| 5,473,773 A | 12/1995 | Aman et al. | |
| 5,504,894 A | 4/1996 | Ferguson et al. | |
| 5,537,542 A | 7/1996 | Eilert et al. | |
| 6,014,700 A * | 1/2000 | Bainbridge et al. | 709/226 |
| 7,080,379 B2 * | 7/2006 | Brenner et al. | 718/105 |
| 8,060,610 B1 | 11/2011 | Herington | |
| 8,099,388 B2 * | 1/2012 | Shen et al. | 707/636 |
| 8,104,039 B2 * | 1/2012 | Huizenga | 718/104 |
| 2005/0102387 A1 | 5/2005 | Herington | |
| 2007/0143442 A1 | 6/2007 | Zhang et al. | |
| 2007/0233838 A1 | 10/2007 | Takamoto et al. | |
| 2008/0046371 A1 * | 2/2008 | He et al. | 705/51 |
| 2011/0125894 A1 | 5/2011 | Anderson et al. | |
| 2012/0066487 A1 | 3/2012 | Brown et al. | |

\* cited by examiner

*Primary Examiner* — Tammy Nguyen
(74) *Attorney, Agent, or Firm* — Michael A. Springs

(57) ABSTRACT

According to some embodiments, a system comprises a work load management module and a plurality of datacenter pods communicatively coupled by a network. The data center pods include a first datacenter pod and a second datacenter pod. The work load management module receives a request to migrate a datacenter application from a first datacenter pod to a second datacenter pod. The work load management module retrieves a first pod environment configuration and a second pod environment configuration and automatically determines one or more differences between the first pod environment configuration and the second pod environment configuration. The work load management module modifies the datacenter application based on the one or more differences to be operable in the second datacenter pod and migrates the datacenter application to the second datacenter pod.

19 Claims, 3 Drawing Sheets

WORK LOAD MANAGEMENT PLATFORM

TECHNICAL FIELD OF THE INVENTION

The present invention relates generally to work load management and more specifically to automated work load management.

BACKGROUND OF THE INVENTION

A financial provider, such as a bank, a broker, or an investment company, may provide online applications that allow customers or other financial institutions to conduct financial transactions. Examples include buying and selling shares of stock, opening accounts, and viewing balances. The financial provider may also provide network applications to support its back-end business operations. The financial provider may use a data center to facilitate the applications. A data center may comprise one or more servers, databases, and/or other computing resources configured to host the datacenter applications.

A datacenter application developer may develop the application in a computing environment that differs from a final production environment. Between development and production, the application may undergo testing in a test computing environment. Because the various computing environments are configured differently, the datacenter application requires modifications when moving from one environment to another. Determining the necessary application changes and making the modifications manually is a time and manpower consuming process. The manual process is also subject to human error.

SUMMARY OF THE INVENTION

According to embodiments of the present disclosure, disadvantages and problems associated with work load management may be reduced or eliminated.

According to some embodiments, a system comprises a work load management module and a plurality of datacenter pods communicatively coupled by a network. The data center pods include a first datacenter pod and a second datacenter pod. The work load management module receives a request to migrate a datacenter application from a first datacenter pod to a second datacenter pod. The work load management module retrieves a first pod environment configuration and a second pod environment configuration and automatically determines one or more differences between the first pod environment configuration and the second pod environment configuration. The work load management module modifies the datacenter application based on the one or more differences to be operable in the second datacenter pod and migrates the datacenter application to the second datacenter pod.

Certain embodiments of the invention may provide one or more technical advantages. In some embodiments, the automatic determination of differences between the first pod environment configuration and the second pod environment configuration removes the possibility of human error and decreases the time and number of people required to migrate a datacenter application from a first datacenter pod to a second datacenter pod. In some embodiments, the work load management module stores the differences between the first datacenter pod and second datacenter pod. Thus, if a datacenter application is not functioning properly in the second datacenter pod, the work load management module may revert the datacenter application back to the first datacenter pod. In some embodiments, the work load management module may configure traffic load limits for datacenter pods. In this manner the work load management module can control how much user traffic is directed towards each datacenter pod. If a datacenter pod needs maintenance, the work load management module may limit all traffic to the datacenter pod and increase traffic to another datacenter pod to handle the customer traffic. The work load management module continuously reports the traffic load of a datacenter. Thus, a datacenter application administrator receives continuous feedback regarding the affect of network changes on a datacenter pod's traffic load.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1:
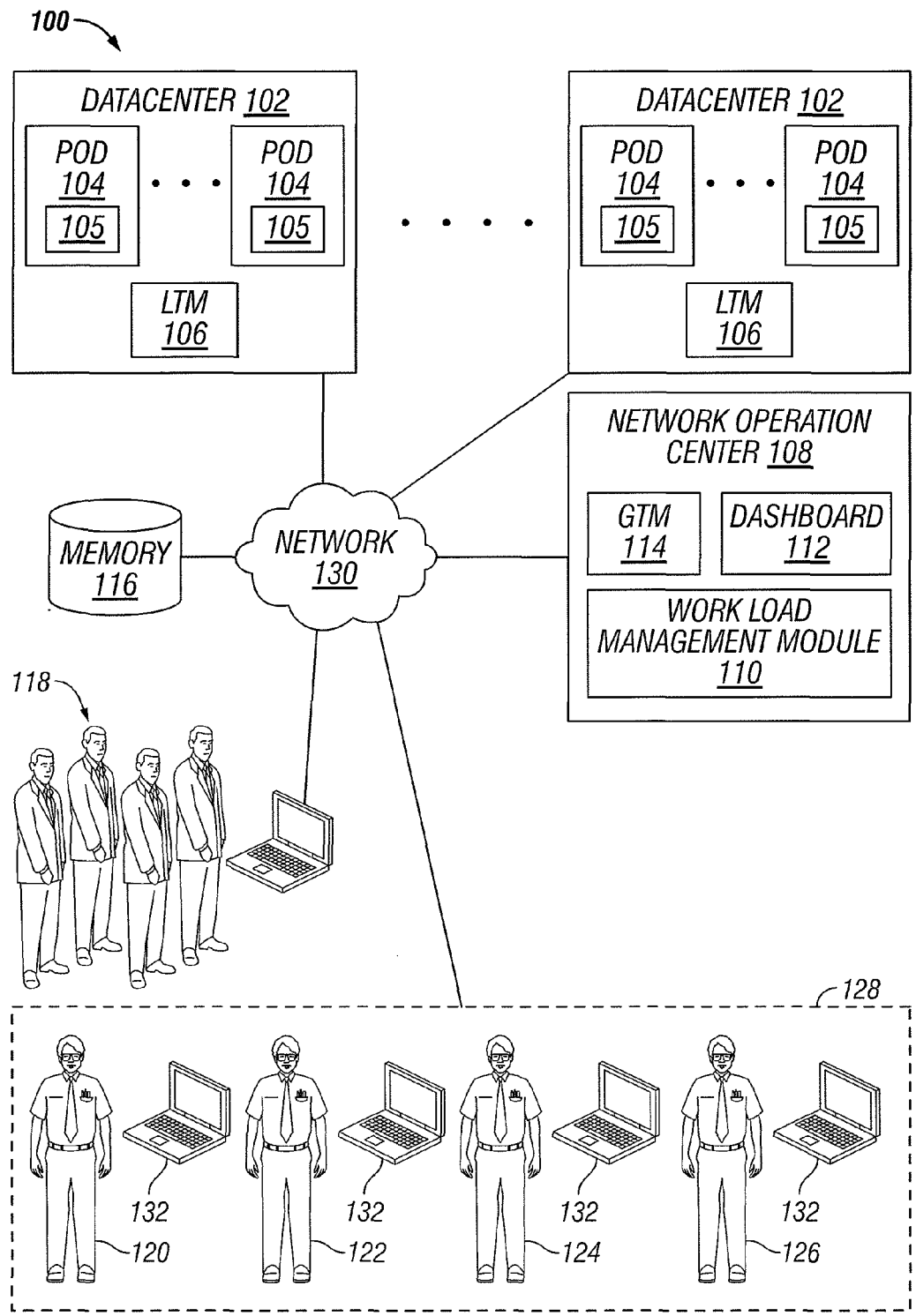
FIG. 1 illustrates an example network view of a work load management system.
Figure 2:
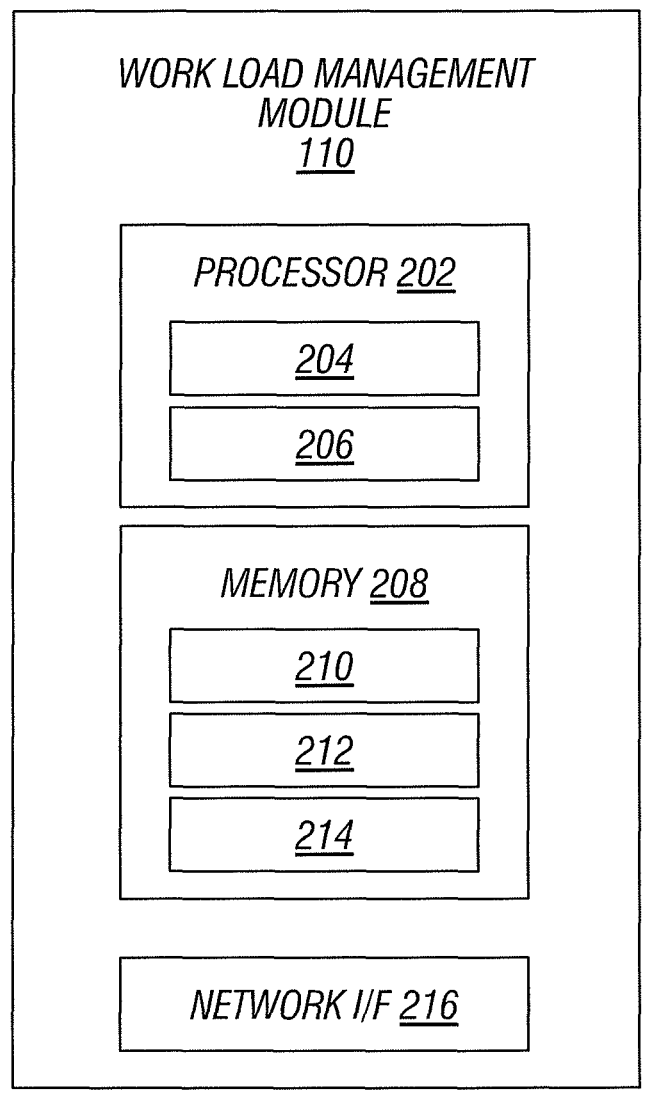
FIG. 2 illustrates an example of the components of a work load management module.
Figure 3:
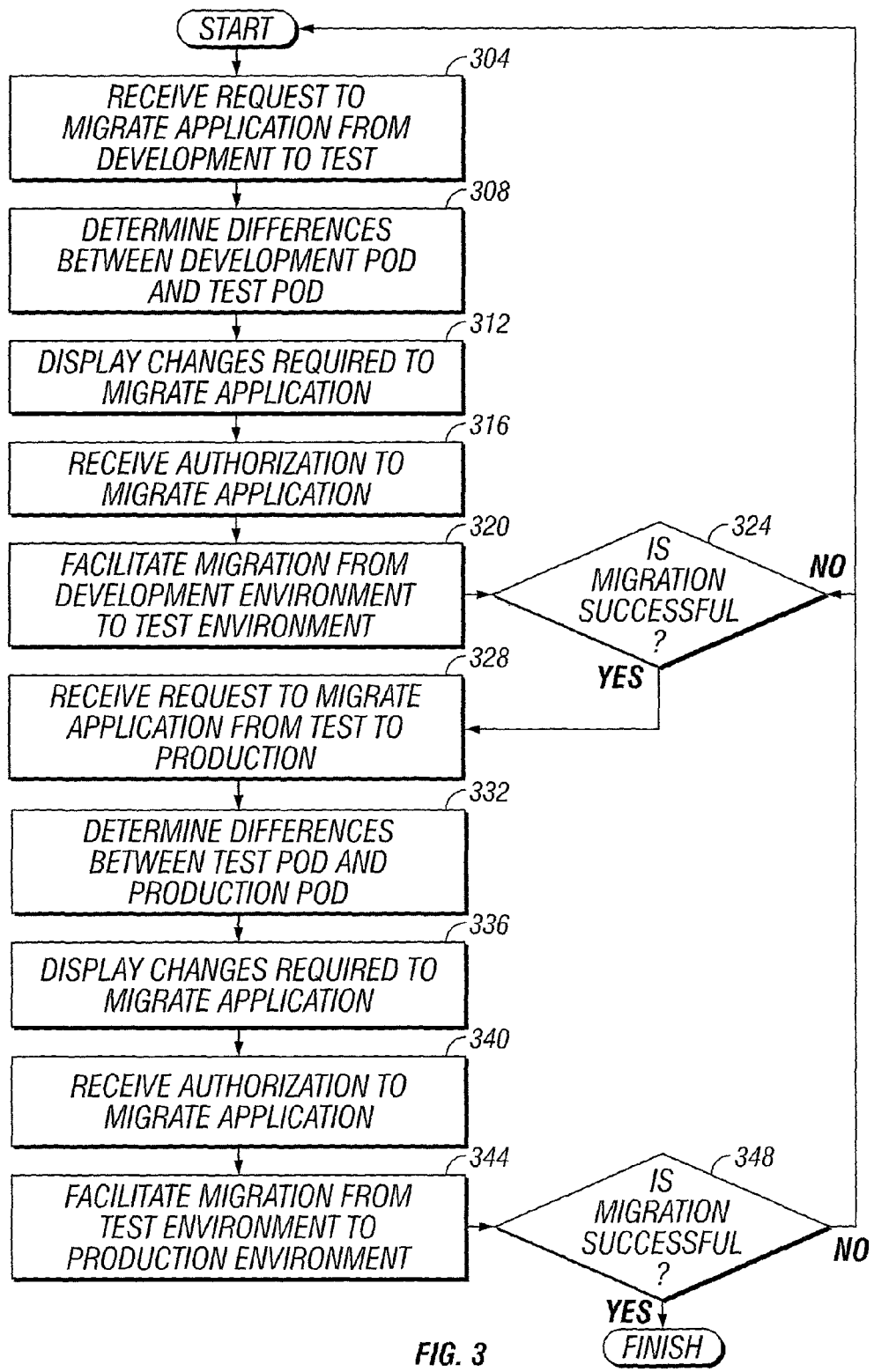
FIG. 3 illustrates an example method for facilitating a work load management system.

Embodiments of the present invention and its advantages are best understood by referring to FIGS. 1 through 3 of the drawings, like numerals being used for like and corresponding parts of the various drawings.

A financial provider, such as a bank, a broker, or an investment company, may provide online applications that allow customers or other financial institutions to conduct financial transactions. Examples include buying and selling shares of stock, opening accounts, and viewing balances. The financial provider may also provide network applications to support its back end business operations. The financial provider may use a data center to facilitate the applications. A data center may comprise one or more servers, databases, and/or other computing resources configured to host the datacenter applications. Datacenters are not unique to financial service providers. Any organization may choose to host its applications in a datacenter.

A datacenter architecture may combine servers, storage resources, network resources, and software resources into pods as an efficient and scalable platform for hosting applications. Pods standardize how hardware and software services present their external interfaces. For example, pod configuration may require executables, header files, libraries, jar files, and other resources to exist at particular and well-known locations. Large scale pods may integrate hardware, software and even infrastructure elements such as power and cooling into a self contained unit. On a small scale, a pod may simply comprise a common directory structure for applications installed on a server. No matter the scale, a pod specifies that data applications conform to a particular configuration.

Datacenters may employ a plurality of pods. Separate pods may host applications for different business functions. For example, a financial institution may host a consumer application in one pod and a back-end business application in another pod. Separate pods may host identical applications spread geographically across separate datacenters. For example, a financial institution might host the same consumer application in several pods in separate datacenters spread around the globe for load sharing, redundancy, and latency concerns. A single datacenter may host the same application in separate pods, but for different purposes. For example, a datacenter may provide one pod for application development, another for application testing, and yet another to host deployed applications. Each of these pods may present a standard interface with a standard list of configuration parameters to the application code. The particular values for each parameter may differ from one pod to another. For example, the path to a web server hosted in a development pod may differ from the path to a web server hosted in a testing pod. Migrating a datacenter application from one pod to another requires modifying the application with the configuration parameters specific to the new pod.

A work load management module may store the configuration information for each pod environment. The stored configurations may be used when migrating a datacenter application from one pod to another. Instead of manually determining which datacenter application parameters need to change for the application to function in the new environment, the work load management system can make the determination automatically. The work load management module may store the changes made to the datacenter application for audit purposes. The module may also quickly revert a datacenter application to a previous configuration if the application does not function properly after a migration from one pod to another. Migration of a datacenter application from one pod to another may require authorization from the work load management module.

A work load management module may also manage the run time attributes of a datacenter pod. The system may monitor the traffic load on each datacenter pod and display the information in real time. The system may allow an administrator to limit the traffic load on a datacenter pod.

FIG. 1 illustrates an example network view of a work load management system according to certain embodiments. System 100 may include a plurality of datacenters 102, a network operations center 108, a network storage device 116, a plurality of datacenter application users 118, and a plurality of associates 128, all communicatively coupled by a network 130.

In general, users 118 interact with datacenter applications hosted at datacenters 102. For example, user 118 provides a request to datacenter 102 for establishing a session with a financial provider. Once the session has been established, user 118 may initiate one or more subsequent requests such as a request to trade shares of stock.

In some embodiments, datacenters 102 host a plurality of pods 104 that provide a standardized environment for hosting a plurality of datacenter applications 105. Datacenter 102 may refer to any suitable combination of hardware and/or software implemented in one or more modules to process data and provide the described functions and operations. In some embodiments, the functions and operations described herein may be performed by a pool of datacenters 102. In some embodiments, datacenter 102 may include, for example, a mainframe, server, host computer, workstation, web server, file server, or any other suitable device operable to process data. In some embodiments, datacenter 102 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

Datacenter applications 105, for example, may comprise online banking applications or back-end business services. Online banking applications may facilitate financial transactions such as consumer account management, transferring funds between accounts, electronic checking, automatic bill payment, loan applications, or any service a financial institution may find suitable to provide its customers. Back-end business services may include accounting, human resources, or any application a financial institution may find suitable for operating its day to day business. Datacenter applications 105 may also comprise business-to-business applications. A local traffic manager (LTM) 106 serves each datacenter 102. LTM 106 is operable to distribute user traffic to pods 104 within each datacenter 102.

Pod 104 presents a standard interface to datacenter applications 105. Pod 104 may comprise servers, storage resources, network resources, and software resources as a self-contained unit. In some embodiments, pod 104 may include both hardware and software. In another embodiment, pod 104 may comprise software only. Associated with each pod 104 is a set of parameters that comprise the standard environment of pod 104. The parameters may include the location of executable files, header files, and libraries. Additional parameters may include the network address of resources such as web servers and databases. The set of parameters may include descriptors for any resources available in the standardized pod environment.

In some embodiments, network operation center 108 comprises work load management module 110, dashboard 112, and global traffic manager (GTM) 114. Network operation center 108 may be geographically separated from datacenters 102, or it may be collocated at one of the plurality of datacenters 102. The components of network operation center 108 may be geographically located anyplace where they may be communicatively coupled to network 130. Work load management module 110 is described in more detail with regard to FIG. 2 below. Dashboard 112 receives traffic load information in real time from work load management module 110 for pods 104.

GTM 114 distributes user traffic to one LTM 106. For example, GTM 114 may receive requests from users 118 requesting a session. GTM 114 may assign the session to one of LTM 106 at one of datacenter 102. In some embodiments, GTM 114 assigns the session to the nearest data center 102. As an example, GTM 114 may analyze information associated with user 118, such as a DNS address, to determine the geographical location of user 118. GTM 114 may then assign user 118 to a nearby data center 102. Assigning user 118 to a nearby data center may reduce latencies associated with message travel time. GTM 114 may take other factors into consideration when performing an assignment, such as the current status of each data center 102 (e.g., active or failed) and load-balancing considerations (e.g., available or overloaded).

In some embodiments, a plurality of associates 128 comprises a development associate 120, a test associate 122, a configuration associate 124, and an operations associate 126. The responsibilities of each associate, though described separately for clarity, may be shared between a single or multiple associates.

Development associate 120 develops datacenter application 105. While developing datacenter application 105, development associate 120 may test datacenter application 105 in development pod 104. When development associate 120 completes the development, development associate 120 may request work load management module 110 to migrate datacenter application 105 to test pod 104.

Test associate 122 executes test cases on datacenter application 105 to verify datacenter application 105 performs according to specifications. After test associate 122 validates datacenter application 105, test associate 122 requests work load management module 110 migrate datacenter application 105 to production pod 104. The responsibilities of test associate 122 may be shared among several associates. For example, a performance test associate 122 may validate the performance of datacenter application 105 under high stress conditions. Performance test associate 122 may then request work load management module 110 to migrate datacenter application 105 to certification test pod 104 for further testing.

Configuration associate 124 updates work load management module 110 with changes to the configuration parameters that comprise the standard environment of pods 104. Configuration associate 124 may update the values stored for each parameter, may add or delete parameters, or may add or delete entire environments for one of pods 104. Configuration associate 124 may also assign permissions associated with certain functions of work load management module 110. For example, configuration associate 124 may configure work load management module 110 to permit only certain trusted test associates 122 to migrate datacenter application 105 from test pod 104 to production pod 104. In another example, configuration associate 124 may configure work load management module 110 to restrict migration from test pod 104 to production pod 104 to certain times of day.

Operations associate 126 manages the traffic load for each datacenter pod 104. When work load management module 110 migrates datacenter application 105 to a production pod 104, operations associate 126 may configure work load management module 110 to restrict the traffic load on that pod 104 to characterize how datacenter application 105 performs under low stress. After operations associate 126 is satisfied datacenter application 105 performs as designed, operation associate 126 may configure work load management module 110 to share the traffic load equally among other pods 104 also executing datacenter application 105.

In general, plurality of associates 128 may interact with work load management module 110 using a workstation 132. In some embodiments, workstation 132 may be communicatively coupled to network 130 and may refer to any suitable computing system, workstation, personal computer such as a laptop, or any other device operable to process data. In certain embodiments, associates 128 may utilize workstation 132 to operate work load management module 110 and dashboard 112.

In some embodiments, network memory 116 may refer to any suitable device communicatively coupled to network 130 and capable of storing and facilitating retrieval of data and/or instructions. Examples of network memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Network memory 116 may store any data and/or instructions utilized by datacenter 102 or work load management module 110.

In certain embodiments, network 130 may refer to any interconnecting system capable of transmitting audio, video, signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In an exemplary embodiment of operation, configuration associate 124 updates work load management module 110 with configuration parameters for development pod 104, test pod 104, and production pod 104. Development associate 120 requests work load management module 110 to migrate datacenter application 105 from development pod 104 to test pod 104. Work load management module 110 determines the differences between development pod 104 and test pod 104 and automatically makes the required changes to datacenter application 105. After verifying proper authorization, work load management module 110 migrates datacenter application 105 to test pod 104. If the migration completes successfully, test associate 122 executes test cases on datacenter application 105 to verify datacenter application 105 performs according to specifications. If the migration was not successful, work load management module 110 reverts datacenter application 105 back to development pod 104. After test associate 122 verifies the operation of datacenter application 105 in test pod 104, test associate 122 requests work load management module 110 migrate datacenter application 105 to production pod 104. Again, work load management module 110 determines the configuration differences between the two pods 104, modifies datacenter application 105 to operate in production pod 104, verifies authorization, and migrates datacenter application 105 to production pod 104. In production pod 104, operations associate 126 views the traffic load on datacenter application 105 using dashboard 112. Operations associate 126 may request work load management module 110 increase or decrease the traffic load on datacenter application 105.

A component of work load management system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to work load management system 100 without departing from the scope of the invention. For example, work load management system 100 may include any number of datacenters 102, pods 104, LTM 106, memory 116, work load management module 110, dashboard 112, GTM 114, users 118, and associates 128. Any suitable logic may perform the functions of work load management system 100 and the components within work load management system 100.

FIG. 2 illustrates an example of the components of a work load management module 110 according to certain embodiments. As discussed above, work load management module 110 is operable to automatically migrate datacenter application 105 from a first pod 104 to a second pod 104. Work load management module 110 receives migration requests from development associates 120 and test associates 122. Operations associates 126 request traffic load information from work load management module 110. Work load management module 110 may include a network server, any suitable remote server, a mainframe, a host computer, a workstation, a web server, a personal computer, a file server, or any other suitable device operable to communicate with datacenters 102, pods 104, GTM 114, network memory 116, and/or user workstation 132. In some embodiments, work load management module 110 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of work load management module 110 may be performed by any suitable combination of one or more servers or other components at one or more locations. In the embodiment where work load management module 110 is a server, the server may be a private server, or the server may be a virtual or physical server. The server may include one or more servers at the same or remote locations. Also, work load management module 110 may include any suitable component that functions as a server. In the illustrated embodiment, work load management module 110 comprises a processor 202, a memory 208, and a network interface 216.

Processor 202 communicatively couples to network interface 216 and memory 208, and controls the operation and administration of work load management module 110 by processing information received from network interface 216 and memory 208. Processor 202 includes any hardware and/or software that operates to control and process information. Processor 202 may be a programmable logic device, a microcontroller, a microprocessor, any suitable processing device, or any suitable combination of the preceding. In some embodiments, processor 202 comprises a configuration manager 204 and a load balancer 206. Configuration manager 204 is operable to facilitate the migration of datacenter application 105 from first pod 104 to second pod 104. Load balancer 206 is operable to manage the real time traffic load on datacenter pods 104.

Memory 208 stores, either permanently or temporarily, data, operational software, or other information for processor 202. Memory 208 includes any one or a combination of volatile or non-volatile local or remote devices suitable for storing information. For example, memory 208 may include RAM, ROM, magnetic storage devices, optical storage devices, or any other suitable information storage device or a combination of these devices. Memory 208 may be local storage or it may refer to network memory 116. While illustrated as including particular modules, memory 208 may include any suitable information for use in the operation of work load management module 110. In the illustrated embodiment, memory 208 includes pod environment descriptors 210, history logs 212, and performance history 214.

Network interface 216, in some embodiments, is communicatively coupled to processor 202 and may refer to any suitable device operable to receive input for work load management module 110, send output from work load management module 110, perform suitable processing of the input or output or both, communicate to other devices, or any combination of the preceding. Network interface 216 may include appropriate hardware (e.g., modem, network interface card, etc.) and software, including protocol conversion and data processing capabilities, to communicate through network 130 or other communication system, which allows work load management module 110 to communicate to other devices. Network interface 216 may include any suitable software operable to access data from various devices such as datacenters 102, pods 104, GTM 114, network memory 116, and/or user workstation 132. Network interface 216 may also include any suitable software operable to transmit data to various devices such as datacenters 102, pods 104, GTM 114, network memory 116, and/or user workstation 132. Network interface 216 may include one or more ports, conversion software, or both.

Pod environment descriptor 210 represents information regarding the location of executable files, header files, and libraries, and the network address and port numbers of resources such as web servers and databases. Pod environment descriptor 210 may comprise information describing any resources available for use by datacenter applications 105. The format of environment descriptor 210 is any format suitable for associating a value with a key. For example, pod environment descriptor 210 might associate the value "10.89.204.1" with the key "Virtual Server IP." A simple pod environment descriptor 210 may adequately represent pod 104 with a single key-value pair. In a more complex example, pod environment descriptor 210 may include hundreds of key-value pairs. Pod environment descriptor 210 includes any number of key-value pairs suitable to describe pod 104. Not all key-value pairs may be applicable for all pods 104. The association may be stored in a flat file using XML, in a database, or any format suitable for storing a collection of key-value pairs.

History logs 212 represent information regarding an audit trail of the operations performed by work load management module 110. For example, when development associate 120 migrates datacenter application 105 from development pod 104 to test pod 104, work load management module 110 may store each pod environment descriptor 210 associated with development pod 104 and test pod 104. Later, operations associate 126 may view the history log to determine what data center applications 105 work load management module 110 migrated to which pods 104 and determine what changes work load management module 110 made to datacenter applications 105. History logs 212 may also enable work load management module 110 to revert datacenter application 105 to previous pod 104 after an unsuccessful migration. Work load management module 110 may use history logs 212 to determine what changes need undoing. History logs 212 may be stored in a flat file, a database, or any format suitable for storing logs.

Performance history 214 represents information regarding traffic load statistics for pods 104. Work load management module 110 monitors the traffic load of pods 104 in real time. Work load management module 110 may also store the traffic load information in performance history 214 to keep a record of the traffic load on pods 104 over time. Operations associate 126 may view performance history 214. Performance history 214 may be stored in a flat file, a database, or any format suitable for storing historical traffic load information.

Configuration manager 204, in some embodiments, facilitates the migration of datacenter application 105 from first datacenter pod environment 104 to second datacenter pod environment 104. For example, configuration manager 204 processes requests from development associate 120 to migrate datacenter application 105 to test pod 104; requests from test associate 122 to migrate datacenter application 105 to a subsequent test pod 104; and requests from test associate 122 to migrate datacenter application 105 to production pod 104. In previous techniques, migrations between pods 104 required manual modification of datacenter application 105, which was time consuming and error-prone. Configuration manager 204 also processes requests to revert datacenter application 105 from second pod 104 back to first pod 104. For example, upon failure of a migration, configuration manager 204 may automatically revert datacenter application 105 from test pod 104 back to development pod 104. In the past, the revert operation was performed manually and it was just as time consuming and error prone as the manual migration process. To perform a migration, configuration manager 204 compares pod environment descriptor 210 for first datacenter pod 104 to pod environment descriptor 210 for second datacenter pod 104 and determines the changes required to datacenter application 105. For example, if the value of "Virtual Server IP" is "10.89.204.1" for first pod 104 and is "10.89.204.2" for second pod 104, then configuration manager 204 modifies datacenter application 105 to use the value for second pod 104. Automatic migration of datacenter application 105 is faster and less error prone than previous techniques. In some embodiments, configuration manager 204 requires authorization before performing migration steps. For example, operations associate 126 may need to approve a migration request from test associate 122 before configuration manager 204 performs the migration. Additionally, configuration manager 204 manages pod environment descriptors 210. Configuration manager 204 may enable configuration associate 124 to add, delete, and modify pod environment descriptors 210. For example, if the IP address for "Virtual Server IP" changes for production pod 104, configuration associate 124 may update pod environment descriptor 210 for production pod 104.

Load balancer 206, in some embodiments, facilitates the real time management of traffic loads on pods 104. Using load balancer 206, operations associate 124 may divide traffic loads across one or more pods 104. Load balancer 206 is operable to divide traffic proportionately among a plurality of pods 104, or assign specific values to one or more pods 104. Load balancer 206 also reports traffic load information to dashboard 112.

Modifications, additions, or omissions may be made to work load management module 110 without departing from the scope of the invention. For example, work load management module 110 may include any number of processors 202, memory 208, and network interfaces 216. Any suitable logic may perform the functions of work load management module 110 and the components within work load management module 110.

FIG. 3 illustrates an example method for facilitating a work load management system. The method begins at step 304 where work load management module 110 receives a request from development associate 120 to migrate datacenter application 105 from development pod 104 to test pod 104.

At step 308, work load management module 110 accesses pod environment descriptor 210 for each pod 104. By comparing environment descriptor 210 for each pod 104, work load management module 110 determines what modifications should be made to datacenter application 105 to facilitate the migration. Work load management module 110 performs this step faster and more accurately than the previous techniques where development associate 120 and test associate 122 manually determined the necessary modifications.

Work load management module 110 displays the changes required to migrate datacenter application 105 from development pod 104 to test pod 104 at step 312. Development associate 120 reviews the information and determines whether to continue or abort the migration. Work load management module 110 may also present the option for development associate 120 to manually modify datacenter application 105.

If development associate 120 determines the migration should continue, at step 316, development associate 120 permits work load management module 110 to migrate datacenter application 105 to test pod 104. In some embodiments, work load management module 110 may verify that development associate 120 is authorized to perform the migration before proceeding. Authorization may be based on user identification, time of day, application type, pod type, or any other parameter suitable for authorizing a migration. Development associate 120 may perform the migration immediately or schedule work load management module 110 to perform the migration automatically at a later time.

At step 320, work load management module 110 modifies application code 105 to operate in test pod 104. In some embodiments, work load management module 110 will automatically migrate modified application code 105 to test pod 104.

At step 324, work load management module 110 determines if the migration was successful. If not, work load management module 110 may automatically revert application 105 back to development pod 104.

After a successful migration, test associate 122 executes test cases on datacenter application 105. If test associate 122 determines datacenter application 105 does not pass the test cases, test associate 122 may request that work load management module 110 revert datacenter application 105 back to development pod 104 for further development. If test associate 122 determines data center application 105 passes the test cases, test associate 122 may request that work load management module 110 migrate datacenter application 105 to subsequent test pod 104 or to production pod 104.

Test associate 122 requests work load management module 110 to migrate datacenter application 105 to production pod 104 at step 328. Similar to the steps 308 to 324 above, work load management module 110 determines the differences between environment descriptor 210 for test pod 104 and production pod 104 at step 332; displays the changes required for the migration at step 336; receives authorization to migrate datacenter application 105 at step 340; and facilitates the migration to production pod 104 at step 344. Although the steps are similar to those above, the actual differences between environment descriptors 210, the modifications to datacenter application 105, and the criteria for authorization may differ when migrating from test pod 104 to production pod 104. For example, the server names will differ and authorization for the migration may require approval from an operations associate 126.

At step 348, work load management module 110 determines if the migration succeeded. If the migration did not complete successfully, work load management module 110 reverts datacenter application 105 back to test pod 104. Depending on the nature of the failure, test associate 122 may revert datacenter application 105 back to development pod 104. If the migration was successful, method 300 is complete.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Certain embodiments of the invention may provide one or more technical advantages. In some embodiments, the automatic determination of differences between the first pod environment configuration and the second pod environment configuration removes the possibility of human error and decreases the time and number of people required to migrate a datacenter application from a first datacenter pod to a second datacenter pod. In some embodiments, the work load management module stores the differences between the first datacenter pod and second datacenter pod. Thus, if a datacenter application is not functioning properly in the second datacenter pod, the work load management module may revert the datacenter application back to the first datacenter pod. In some embodiments, the work load management module may configure traffic load limits for datacenter pods. In this manner the work load management module can control how much user traffic is directed towards each datacenter pod. If a datacenter pod needs maintenance, the work load management module may limit all traffic to the datacenter pod and increase traffic to another datacenter pod to handle the customer traffic. The work load management module continuously reports the traffic load of a datacenter. Thus, a datacenter application administrator receives continuous feedback regarding the affect of network changes on a datacenter pod's traffic load.

Although the present disclosure describes several embodiments in detail, it should be understood that a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
receiving, by a work load management module, a request to migrate a datacenter application hosted by a first datacenter pod to a second datacenter pod, each datacenter pod comprising a self-contained unit of standardized processing, storage, and network resources for hosting data center applications, the request comprising a first pod identifier, a second pod identifier, and authorization information;
verifying that the request to migrate the datacenter application is allowed using the authorization information in the received request;
retrieving, from a database of pod environment configurations, a first pod environment configuration using the first pod identifier and a second pod environment configuration using the second pod identifier, each pod environment configuration comprising information describing the processing, storage, and network resources provided by its corresponding datacenter pod;
automatically determining, by the work load management module, one or more differences between the first pod environment configuration and the second pod environment configuration;
modifying the datacenter application based on the one or more differences such that the modified datacenter application is operable in the second datacenter pod; and
migrating the modified datacenter application to the second datacenter pod such that the second datacenter pod hosts the modified datacenter application.

2. The method of claim 1, further comprising storing the one or more differences between the first pod environment configuration and the second pod environment configuration.

3. The method of claim 1, further comprising:
receiving a request to revert the modified datacenter application to the first datacenter pod;
automatically determining, by the work load management module, one or more differences between the first pod environment configuration and the second pod environment configuration;
modifying the datacenter application based on the one or more differences to be operable in the first datacenter pod; and
reverting the datacenter application to the first datacenter pod such that the first datacenter pod hosts the datacenter application.

4. The method of claim 1, further comprising receiving updates, by the work load management module, for a selected one of the first pod environment configuration associated with the first pod identifier and the second pod environment configuration associated with the second pod identifier.

5. The method of claim 1, wherein the first datacenter pod is an application development pod and the second datacenter pod is a testing pod.

6. The method of claim 1, wherein the first datacenter pod is a testing pod and the second datacenter pod is a production pod.

7. A system, comprising:
a plurality of datacenter pods, the plurality of datacenter pods including a first datacenter pod and a second datacenter pod, each datacenter pod of the plurality of datacenter pods comprising a self-contained unit of standardized processing, storage, and network resources for hosting data center applications; and
a work load management module comprising a processor, the work load management module operable to:
determine a traffic load on at least one of the plurality of datacenter pods;
modify a traffic load limit for at least one of the plurality of datacenter pods;
receive a request to migrate a datacenter application hosted by the first datacenter pod to the second datacenter pod, the request comprising a first pod identifier and a second pod identifier;
retrieve a first pod environment configuration using the first pod identifier and a second pod environment configuration using the second pod identifier, each pod environment configuration comprising information describing the processing, storage, and network resources provided by its corresponding datacenter pod;
automatically determine one or more differences between the first pod environment configuration and the second pod environment configuration;
modify the datacenter application based on the one or more differences such that the modified datacenter application is operable in the second datacenter pod; and
migrate the modified datacenter application to the second datacenter pod such that the second datacenter pod hosts the modified datacenter application.

8. The system of claim 7, wherein the workload management module is further operable to store the one or more differences between the first pod environment configuration and the second pod environment configuration.

9. The system of claim 7, wherein the workload management module is further operable to:
receive a request to revert the modified datacenter application to the first datacenter pod;
automatically determine one or more differences between the first pod environment configuration and the second pod environment configuration;
modify the datacenter application based on the one or more differences to be operable in the first datacenter pod; and
revert the datacenter application to the first datacenter pod such that the first datacenter pod hosts the datacenter application.

10. The system of claim 7, wherein the workload management module is further operable to receive updates for a selected one of the first pod environment configuration associated with the first pod identifier and the second pod environment configuration associated with the second pod identifier.

11. The system of claim 7, wherein the request to move a datacenter application from a first datacenter pod to a second datacenter pod comprises authentication information used to authorize the request.

12. The system of claim 7, wherein the workload management module is further operable to
continuously report the traffic load on at least one of the plurality of datacenter pods.

13. The system of claim 12, wherein the traffic load limit is specified as a percentage of total capacity of the at least one of the datacenter pods.

14. An apparatus, comprising:
a network interface operable to:
receive a request to migrate a datacenter application hosted by a first datacenter pod to a second datacenter pod, each datacenter pod comprising a self-contained unit of standardized processing, storage, and network resources for hosting data center applications, the request comprising a first pod identifier, a second pod identifier, and authorization information; and
a processor communicatively coupled to the network interface and operable to:
verify that the request to migrate the datacenter application is allowed using the authorization information in the received request;
retrieve a first pod environment configuration using the first pod identifier and a second pod environment configuration using the second pod identifier, each pod environment configuration comprising information describing the processing, storage, and network resources provided by its corresponding datacenter pod;
automatically determine one or more differences between the first pod environment configuration and the second pod environment configuration;
modify the datacenter application based on the one or more differences such that the modified datacenter application is operable in the second datacenter pod; and
migrate the modified datacenter application to the second datacenter pod such that the second datacenter pod hosts the modified datacenter application.

15. The apparatus of claim 14, wherein the processor is further operable to store the one or more differences between the first pod environment configuration and the second pod environment configuration.

16. The apparatus of claim 14, wherein the network interface is further operable to receive a request to revert the modified datacenter application to the first datacenter pod; and
the processor is further operable to:
automatically determine one or more differences between the first pod environment configuration and the second pod environment configuration;
modify the datacenter application based on the one or more differences to be operable in the first datacenter pod; and
revert the datacenter application to the first datacenter pod such that the first datacenter pod hosts the datacenter application.

17. The apparatus of claim 14, wherein the network interface is further operable to receive updates for a selected one of the first pod environment configuration associated with the first pod identifier and the second pod environment configuration associated with the second pod identifier.

18. The apparatus of claim 14, wherein the first datacenter pod is an application development pod and the second datacenter pod is a testing pod.

19. The apparatus of claim 14, wherein the first datacenter pod is a testing pod and the second datacenter pod is a production pod.

* * * * *